United States Patent
Nagasaki et al.

(10) Patent No.: US 10,148,938 B2
(45) Date of Patent: Dec. 4, 2018

(54) VEHICLE-MOUNTED IMAGE RECOGNITION DEVICE TO SET A STEREOSCOPIC-VISION AND MONOCULAR-VISION IMAGE AREAS

(71) Applicant: Hitachi Automotive Systems, Ltd., Hitachinaka-shi, Ibaraki (JP)

(72) Inventors: Takeshi Nagasaki, Hitachinaka (JP); Haruki Matono, Tokyo (JP); Yoshiyuki Mutou, Hitachinaka (JP); Koji Doi, Hitachinaka (JP); Yuhi Shiina, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 145 days.

(21) Appl. No.: 15/501,920

(22) PCT Filed: Aug. 19, 2015

(86) PCT No.: PCT/JP2015/073174
§ 371 (c)(1),
(2) Date: Feb. 6, 2017

(87) PCT Pub. No.: WO2016/051981
PCT Pub. Date: Apr. 7, 2016

(65) Prior Publication Data
US 2017/0244954 A1    Aug. 24, 2017

(30) Foreign Application Priority Data

Sep. 30, 2014  (JP) .................................. 2014-201369

(51) Int. Cl.
*H04N 13/239* (2018.01)
*B60R 21/00* (2006.01)
(Continued)

(52) U.S. Cl.
CPC ............ *H04N 13/239* (2018.05); *B60R 11/04* (2013.01); *B60R 21/00* (2013.01);
(Continued)

(58) Field of Classification Search
CPC ..... H04N 13/239; G06K 9/00791; G06T 7/00
See application file for complete search history.

(56) References Cited

U.S. PATENT DOCUMENTS

2003/0095178 A1  5/2003  Shibayama
2009/0010495 A1  1/2009  Schamp et al.

FOREIGN PATENT DOCUMENTS

EP      2 642 429 A2      9/2013
JP      2003-158668 A     5/2003
(Continued)

OTHER PUBLICATIONS

International Search Report (PCT/ISA/210) issued in PCT Application No. PCT/JP2015/073174 dated Nov. 24, 2015 with English-language translation (five (5) pages).
(Continued)

*Primary Examiner* — Y Lee
(74) *Attorney, Agent, or Firm* — Crowell & Moring LLP

(57) ABSTRACT

A vehicle-mounted image recognition device addresses the problem of obtaining a vehicle-mounted image recognition device capable of improving the efficiency of image processing. This vehicle-mounted image recognition device 100 for solving the abovementioned problem sets a stereoscopic vision image region 502 in each of captured images 501 captured by a pair of right and left cameras, while setting a monocular vision image region 503 in the captured image 501 captured by one of the cameras, scans each of the captured images captured by the pair of right and left cameras along an image scanning line in a right-left direction, distributes the scanned image into stereoscopic vision
(Continued)

image data obtained by scanning the inside of the stereoscopic vision image region 502 and monocular vision image data obtained by scanning the inside of the monocular vision image region 503, performs stereoscopic vision image processing using the stereoscopic vision image data, performs monocular vision image processing using the monocular vision image data, and recognizes an object corresponding to the type of an application using image processing results.

3 Claims, 9 Drawing Sheets

(51) Int. Cl.
  *G06T 7/00*    (2017.01)
  *H04N 5/225*   (2006.01)
  *H04N 5/232*   (2006.01)
  *B60R 11/04*   (2006.01)
  *G06K 9/00*    (2006.01)
  *H04N 13/20*   (2018.01)

(52) U.S. Cl.
  CPC ............ *G06K 9/00791* (2013.01); *G06T 7/00* (2013.01); *H04N 5/225* (2013.01); *H04N 5/232* (2013.01); *H04N 13/20* (2018.05); *B60R 2300/105* (2013.01); *B60R 2300/107* (2013.01); *B60R 2300/303* (2013.01)

(56) References Cited

FOREIGN PATENT DOCUMENTS

| | | |
|---|---|---|
| JP | 2008-507454 A | 3/2008 |
| JP | 2009-17157 A | 1/2009 |
| JP | 2011-134207 A | 7/2011 |

OTHER PUBLICATIONS

Japanese Written Opinion (PCT/ISA/237) issued in PCT Application No. PCT/JP2015/073174 dated Nov. 24, 2015 with English-language translation (six (6) pages).

Extended European Search Report issued in counterpart European Application No. 15847652 dated May 4, 2018 (twelve (12) pages).

Sivaraman et al., "Combining Monocular and Stereo-Vision for Real-Time Vehicle Ranging and Tracking on Multilane Highways", Intelligent Transportation Systems, 2011, pp. 1249-1254, Washington, DC, XP032023311.

Chen et al., "Ohio State University at the 2004 DARPA Grand Challenge: Developing a Completely Autonomous Vehicle", IEEE Intelligent Systems, 2004, pp. 8-11, New York, NY, XP011120834.

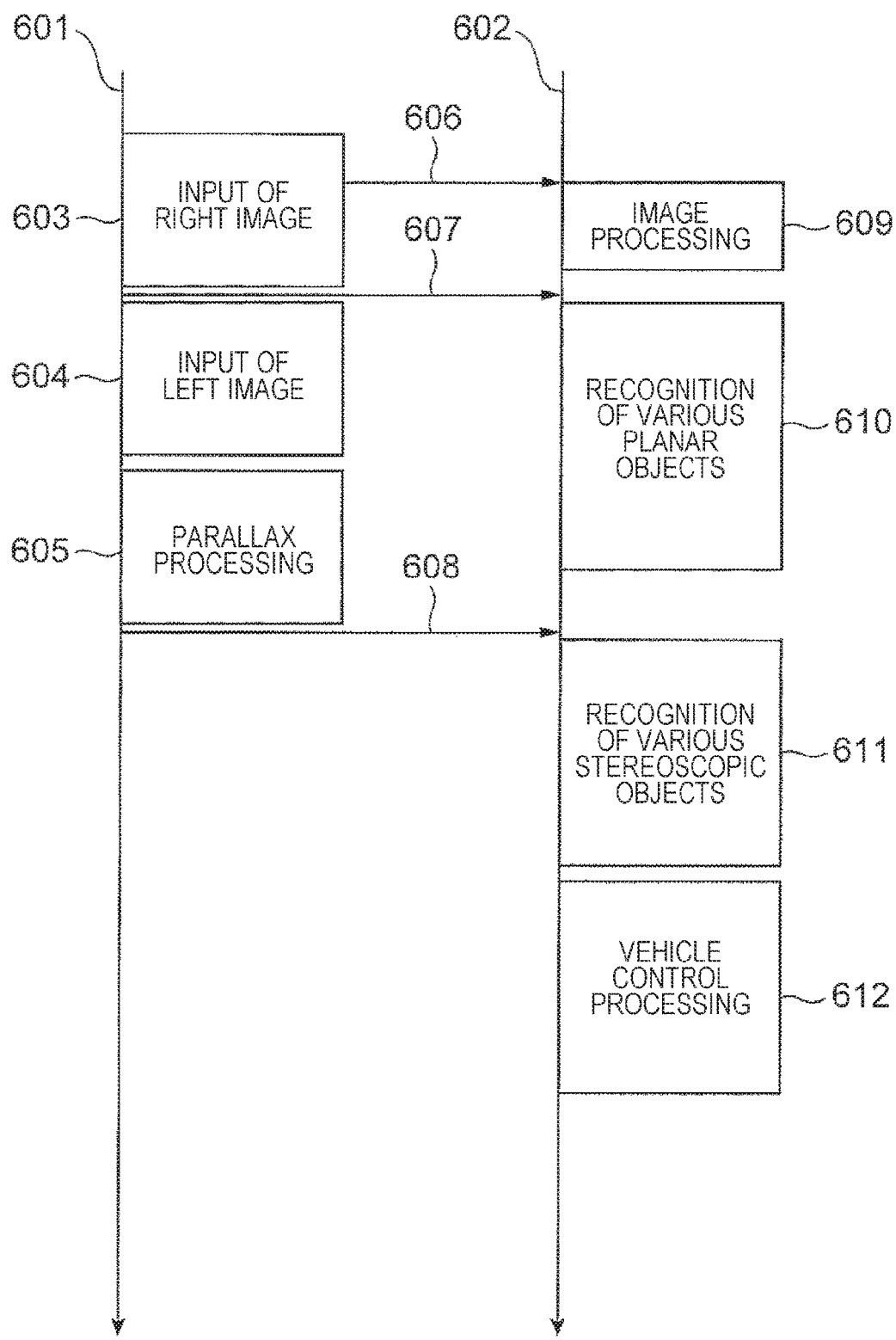

FIG. 7

|   | 1 | 2 | 3 | 4 | ... |
|---|---|---|---|---|---|
| 1 | G | R | G | R | |
| 2 | B | G | B | G | |
| 3 | G | R | G | R | |
| 4 | B | G | B | G | |
| ... | | | | | |

FIG. 8

|   | 1 | 2 | 3 | 4 | ... |
|---|---|---|---|---|---|
| 1 | p11 | p12 | p13 | p14 | |
| 2 | p21 | p22 | p23 | p24 | |
| 3 | p31 | p32 | p33 | p34 | |
| 4 | p41 | | | | |
| ⋮ | | | | | |

*FIG. 9*

| +1 | 0 | -1 |
|----|---|----|
| +1 | 0 | -1 |
| +1 | 0 | -1 |

*FIG. 10*

| +1 | +1 | +1 |
|----|----|----|
| 0  | 0  | 0  |
| -1 | -1 | -1 |

VEHICLE-MOUNTED IMAGE RECOGNITION DEVICE TO SET A STEREOSCOPIC-VISION AND MONOCULAR-VISION IMAGE AREAS

TECHNICAL FIELD

The present invention relates to a vehicle-mounted image recognition device.

BACKGROUND ART

PTL 1 discloses a technique of a vehicle-mounted image processing device that can reduce a load of a process of detecting a plurality of objects by generating a processed image with image quality suitable for detecting the objects for each area. The vehicle-mounted image processing device disclosed in PTL 1 includes an area setting unit that sets an obstacle area and a road surface area on the basis of a position of an object in the front of its own vehicle detected by a radar device and an image generating unit that generates the processed image by adjusting a dynamic range and a resolution of a forward image which is captured by a camera for each area.

CITATION LIST

Patent Literature

PTL 1: Japanese Unexamined Patent Application Publication No. 2009-17157

SUMMARY OF INVENTION

Technical Problem

However, in the technique disclosed in PTL 1, since the radar device for detecting a position of an object is also used in addition to the camera, the device is complicated as a whole and thus it is not possible to cope with the camera alone. When the image generating unit generates a processed image for each of the obstacle area and the road surface area, a whole image captured by the camera is used. Accordingly, it takes time to process the image and it is difficult to improve efficiency of the image processing.

The present invention is made in consideration of the above-mentioned circumstances and an object thereof is to provide a vehicle-mounted image recognition device that can improve efficiency of image processing.

Solution to Problem

In order to solve the above issue, a vehicle-mounted image recognition device recognizes a vehicle exterior environment using a captured image which is captured with a pair of right and left cameras to execute a plurality of applications, and includes a distribution unit configured to set a stereoscopic-vision image area in captured images captured with the pair of right and left cameras and to set a monocular-vision image area in captured images captured with one camera on the basis of a type of the application which is executed among the plurality of applications, to scan the captured images captured with the pair of right and left cameras along an image scanning line in a right-left direction, and to distribute the captured images to stereoscopic-vision image data obtained by scanning the stereoscopic-vision image areas and monocular-vision image data obtained by scanning the monocular-vision image areas; a stereoscopic-vision image processing unit configured to perform stereoscopic-vision image processing using the stereoscopic-vision image data; a monocular-vision image processing unit configured to perform monocular-vision image processing using the monocular-vision image data; and an object recognizing unit configured to recognize an object depending on the type of the application using an image processing result of the stereoscopic-vision image processing unit and an image processing result of the monocular-vision image processing unit.

Advantageous Effects of Invention

According to the present invention, it is possible to distribute resources such as a central processing unit (CPU) image characteristics to various image recognition applications while maintaining a processing cycle as much as possible without damaging performance of the image recognition applications for recognition of a preceding vehicle, recognition of a white line, recognition of a traffic sign, and the like. Particularly, an application for mainly performing image processing such as recognition of a traffic sign or detection of a vehicle tail lamp and an application for mainly performing three-dimensional object processing such as detection of a person or a vehicle can be used in parallel. Other objects, configurations, and advantages will be apparent from the following description of embodiments.

BRIEF DESCRIPTION OF DRAWINGS

FIG. 6 is a timing chart illustrating processes in the present invention.

FIG. 7 is a diagram illustrating an example of an image which is captured with a conventional imaging element.

FIG. 8 is a diagram illustrating a target image from which an edge is extracted and pixels pij thereon.

FIG. 9 is a diagram illustrating an example of a filter for calculating edge strength in a vertical direction.

FIG. 10 is a diagram illustrating an example of a filter for calculating edge strength in a horizontal direction.

DESCRIPTION OF EMBODIMENTS

Figure 1:
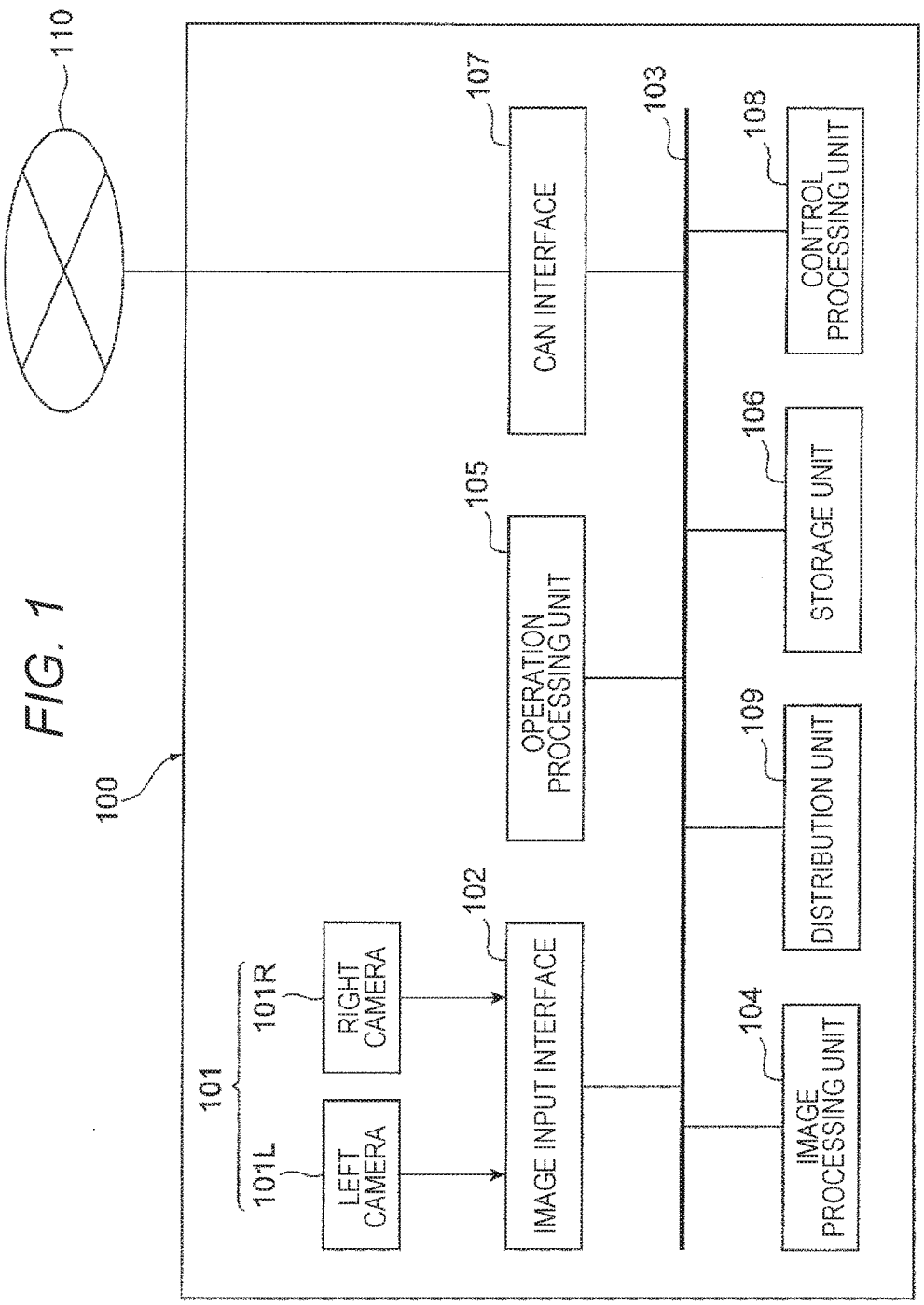
FIG. 1 is a block diagram illustrating a schematic configuration of a vehicle-mounted image recognition device according to the present invention.

Hereinafter, embodiments of the present invention will be described with reference to the accompanying drawings. Like elements in the drawings will be referenced by like reference numerals and description thereof will not be repeated.

FIG. 1 is a block diagram illustrating the entire configuration of a vehicle-mounted image recognition device according to an embodiment. A vehicle-mounted image recognition device 100 according to this embodiment is a device that recognizes a vehicle exterior environment and supports driving of a vehicle by executing a plurality of applications on the basis of a forward image of the vehicle. The cubicle-mounted image recognition device 100 includes stereoscopic camera 101, an image input interface 102, an image processing unit 104, an operation processing unit 105, a storage unit 106, a control processing unit 108, and a distribution unit 109. The image input interface 102, the image processing unit 104, the operation processing unit 105, the storage unit 106, the control processing unit 108, and the distribution unit 109 are connected to each other via a bus 103.

The stereoscopic camera 101 includes a left camera 101L and a right camera 101R which are attached with a predetermined gap in a vehicle width direction therebetween and captures a forward image of a vehicle. The left camera 101L and the right camera 101R are constituted by an imaging element such as a charge coupled device (CCD) or a complementary metal oxide semiconductor (CMOS). The image input interface 102 serves to control the imaging of the stereoscopic camera 101 and to receive a captured image. Image data received via the image input interface 102 is output to the image processing unit 104 ma the bus 103 and is processed thereby. An intermediate result of the processing or image data as a final result is output via the bus 103 and is stored in the storage unit 106.

The image processing unit 104 compares a left image acquired from an imaging element of the left camera 101L and a right image acquired from an imaging element of the right camera 101R, performs image correction such as correction of device-specific unevenness due to the imaging element or noise interpolation on the acquired images, and additionally outputs and stores the result to and in the storage unit 106. The image processing unit 104 calculates corresponding positions between the left image and the right image, calculates parallax information, and additionally outputs and stores the result to and in the storage unit 106.

The operation processing unit 105 recognizes various objects around the vehicle using the images and the parallax information (for example, distance information for points on the images) stored in the storage unit 106. Various objects include a person, a vehicle, other obstacles, a traffic signal, a traffic sign, and a tail lamp or a headlight of a vehicle. The operation processing unit 105 outputs the recognition result or a part of an intermediate result of calculation via the bus 103 and stores the result in the storage unit 106. The operation processing unit 105 determines a vehicle control policy using the recognition result of various objects.

A part of the vehicle control policy acquired as the calculation result or the object recognition result is transmitted to a vehicle-mounted network CAN 110 via a CAN interface 107 and braking of the vehicle is carried out accordingly. Regarding this operation, the control processing unit 108 monitors whether the processing units cause an abnormal operation, whether an error occurs in transmission of data, or the like and prevents an abnormal operation.

The storage unit 106 stores a variety of information on the operation of the vehicle-mounted image recognition device 100 and stores, for example, image information acquired by the image processing unit 104 or a scanning result or prepared image information from the operation processing unit 105. The control processing unit 108 controls the vehicle-mounted image recognition device 100 as a whole, outputs a control signal for image processing to the image processing unit 104 to control the operation of the image processing unit 104, or outputs a control signal to the operation processing unit 105 to cause the image processing unit 104 to perform operation processing. The image processing unit 104, the operation processing unit 105, the storage unit 106, the control processing unit 108, the image input interface 102, and the CAN interface 107 are constituted by one or more computer units.

The distribution unit 109 distributes images captured with one camera of the stereoscopic camera 101 to monocular-vision image data received by a scanning line corresponding to plural rows and distributes the images captured with both cameras 101l and 101R of the stereoscopic camera 101 to stereoscopic-vision image data received in a predetermined area, on the basis of an image request required for executing the applications. For example, a traffic sign recognition application has only to know presence of a traffic sign and thus requires monocular-vision image data. On the other hand, a vehicle/pedestrian recognition application uses detailed information such as a distance or a position and thus requires stereoscopic-vision image data. Examples of the applications include light distribution control, lane departure warning, interrupting vehicle warning, overtaking vehicle warning, and lane running support in addition to the vehicle/pedestrian recognition and the traffic sign recognition.

The vehicle-mounted image recognition device 100 further includes a controller area network (CAN) interface 107. The CAN interface 107 is connected to the input interface 102, the image processing unit 104, the operation processing unit 105, the storage unit 106, the control processing unit 108, and the distribution unit 109 via the bus 103. The vehicle control policy or a part of the object recognition result acquired as the calculation result of the operation processing unit 105 is output to a control system of the vehicle via the CAN interface 107 and the vehicle-mounted network CAN 110 and the vehicle is controlled accordingly. Regarding this operation, the control processing unit 108 monitors whether the processing units cause an abnormal operation, whether an error occurs in transmission of data, or the like and prevents an abnormal operation.

A flow or conventional representative stereoscopic-vision image processing will be described below with reference to FIGS. 2 and 3.

Figure 2:
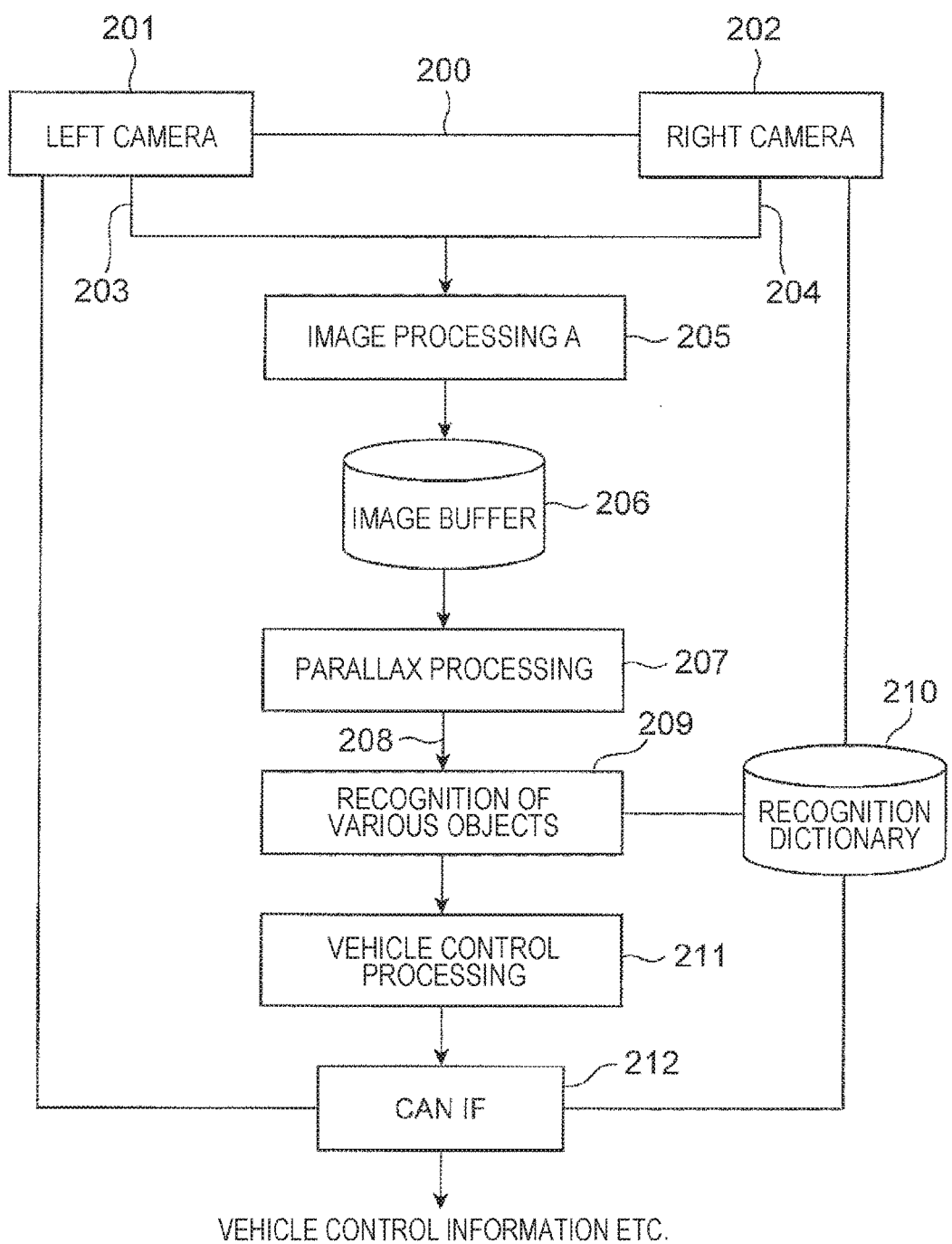
FIG. 2 is a flowchart illustrating details of stereoscopic camera processing which serves as a basis of the present invention.
Figure 3:
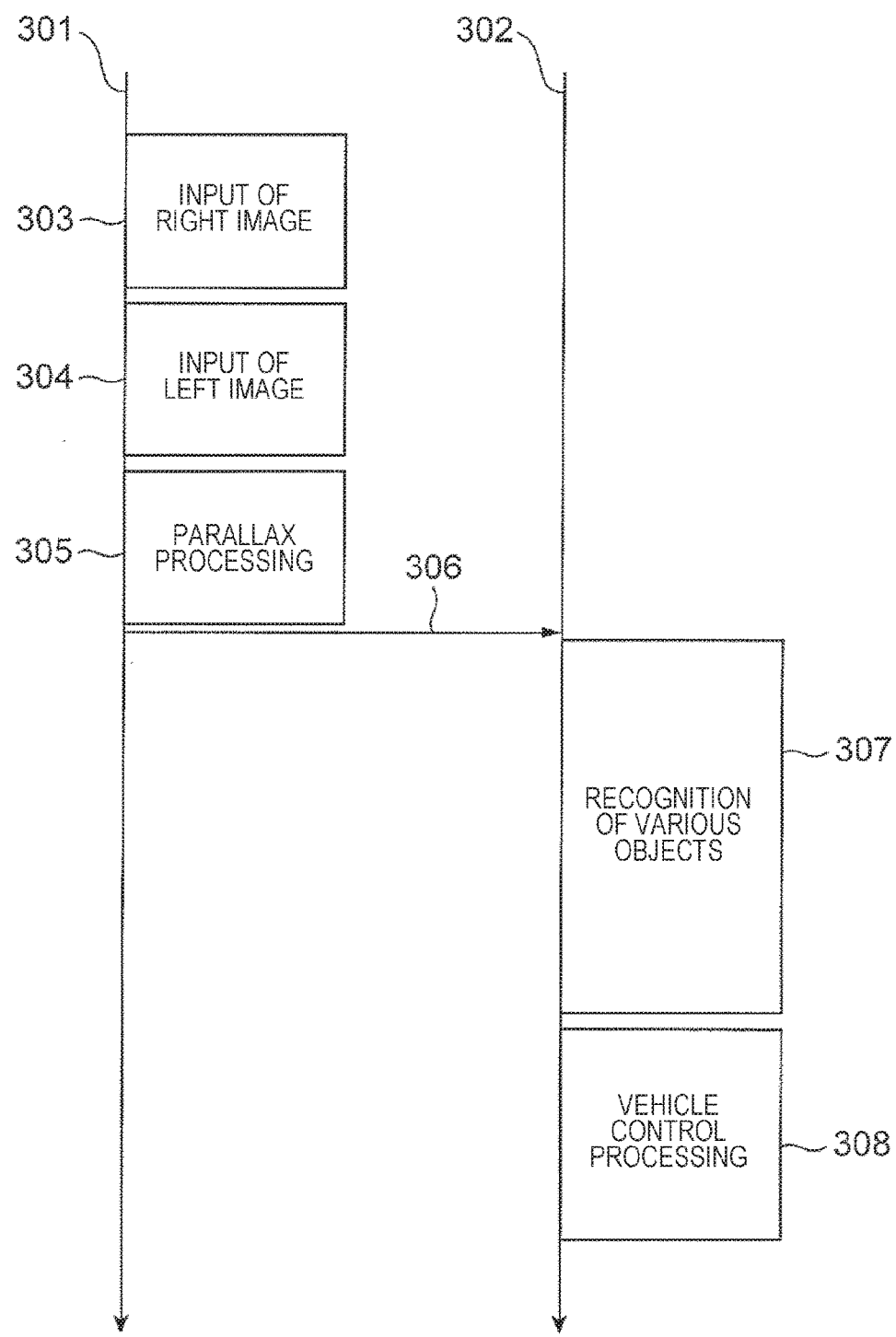
FIG. 3 is a timing chart illustrating various processes.

FIG. 2 is a flowchart 11 lustrating details of conventional representative stereoscopic-vision image processing and FIG. 3 is a timing chart illustrating a variety of processing.

A vehicle-mounted stereoscopic camera device 200 captures an image using a left camera 201 and a right camera 202 and performs image processing A205 on image data 203 and 204 acquired by the cameras. In the image processing A205, a process of correcting an image to absorb specific faults of the imaging element of the left camera 201 and the imaging element of the right camera 202 is performed. The processing result of the image processing A205 is accumulated as a corrected image in an image buffer 206. The image buffer 206 is disposed in the storage unit 106 illustrated in FIG. 1.

Parallax processing 207 which is stereoscopic-vision image processing is then performed. In the parallax processing 207, images are compared using two corrected images and parallax information of the images acquired from the right and left cameras is acquired as a result. Positions of the images acquired with the right and left cameras corresponding to a target point of a target object are apparent by the parallax between the right and left images, and a distance to the object is acquired by the principle of triangulation. The image processing A205 and the parallax processing 207 are performed by the image processing unit 104 illustrated in FIG. 1, and the finally acquired corrected images and the parallax information are stored in the storage unit 106.

Recognition of various objects 209 is performed using the corrected images and the parallax information. Examples of the object to be recognized include a person, a vehicle, other three-dimensional objects, a traffic sign, a traffic signal, and a tail lamp. A recognition dictionary 210 is used for recognition if necessary.

Vehicle control processing 211 is performed in consideration of the object recognition result and a vehicle state (such as a speed and a steering angle). By the vehicle control processing 211, for example, an occupant is warned and braking or steering angle adjustment of the vehicle is performed. Alternatively, a policy of performing object avoidance control is determined accordingly and the determination result is output via a CAN interface 212.

The recognition of various objects 209 and the vehicle control processing 211 are performed by the operation processing unit 105 illustrated in FIG. 1, and outputting to the CAN s performed by the CAN interface 107. These processing units are constituted, for example, by one or more computer units and are configured to exchange data each other.

In the timing chart illustrated in FIG. 3, two system flows are illustrated in image processing 301 and operation processing 302. The flow of the image processing 301 represents processing times in the image processing unit 104 illustrated in FIG. 1, and the flow of the operation processing 302 represents processing times in the operation processing unit 105 illustrated in FIG. 1.

First, in the image processing 301, right image input 303 is performed. This corresponds to a process of capturing an image with the right camera 202, performing the image processing A205 on the image, and storing image data of the right image in the image buffer 206 in FIG. 2. Then, left image input 304 is performed. This corresponds to a process of capturing an image with the left camera 201, performing the image processing A205 on the image, and storing image data of the left image in the image buffer 206 in FIG. 2.

Then, parallax processing 305 is performed. This corresponds to the parallax processing 207 of reading two right and left images from the image buffer 206, calculating the parallax by comparing both images, and storing the parallax information acquired through the calculation in the storage unit 106 in FIG. 2. At this time, the images and the parallax information are arranged in the storage unit 106. Then, recognition of various objects 307 and vehicle control processing 308 are performed by the operation processing unit 105 and the result is output to the CAN.

As can be seen from the timing chart illustrated in FIG. 3, in the conventional representative vehicle-mounted stereoscopic camera device 200, various recognition applications operate at the timing of the recognition of various objects 307. This configuration can simplify the processing but has several problems. One is that required information or image quality differs in the recognition of various objects 307.

For example, an image acquired through the parallax processing needs to be subjected to image processing suitable for objects on the front side so as to satisfactorily capture a vehicle or a pedestrian on the front side as a stereoscopic object, but the image may not be suitable for recognizing peripheral objects such as a traffic signal or a traffic sign.

Not all of various recognition applications require parallax information. One representative example is an application for detecting a traffic sign or a vehicle tail lamp at a long distance. This application mainly performs processing using image information rather than parallax information, and thus it is expected to improve calculation processing efficiency of the application using the above-mentioned characteristics.

A process flow in the vehicle-mounted image recognition device according to the present invention will be described below with reference to FIGS. 4 to 5(d).

Figure 4:
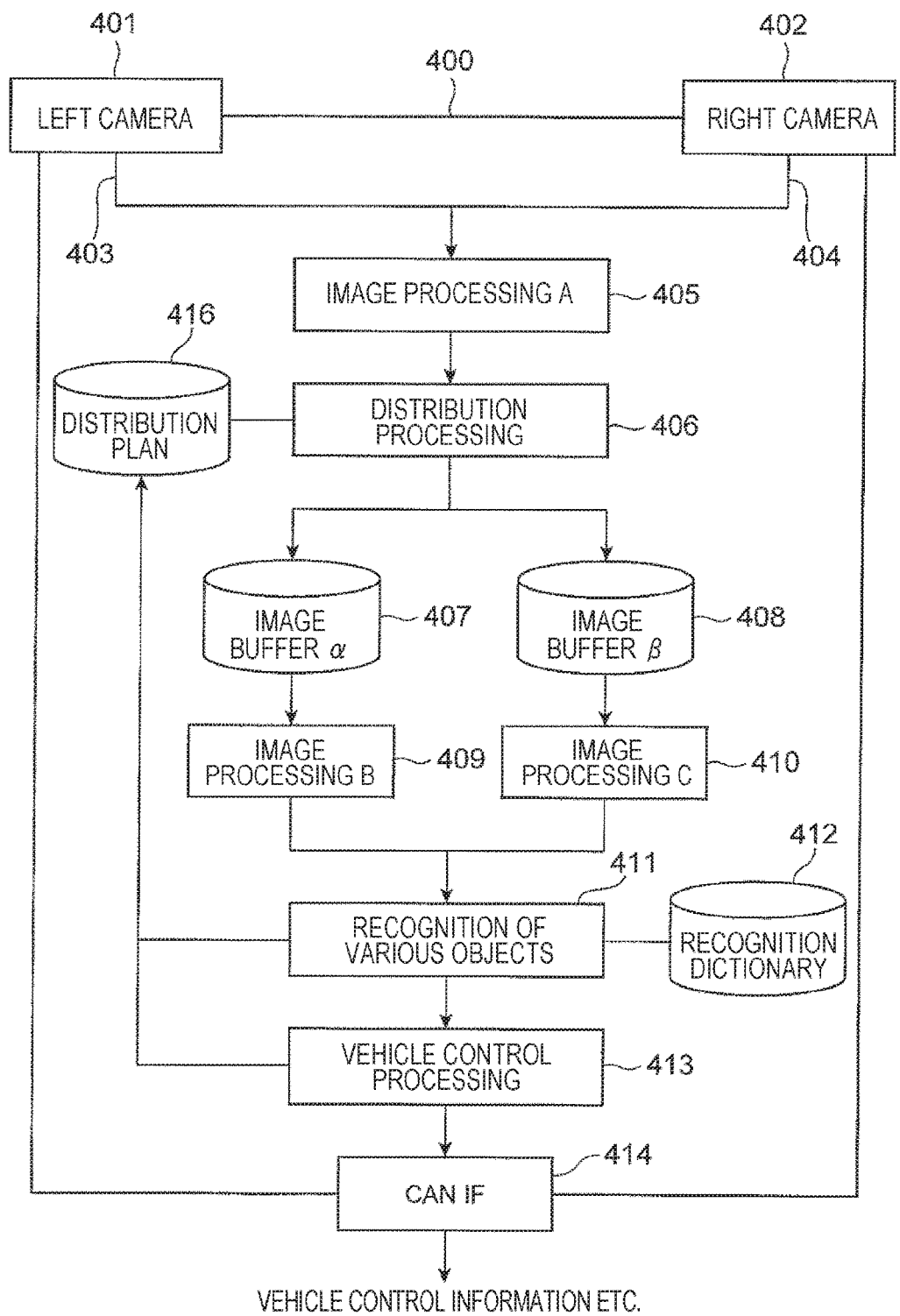
FIG. 4 is a flowchart illustrating a process flow in a vehicle-mounted image recognition device according to an embodiment.

FIG. 4 is a flowchart illustrating a process flow the vehicle-mounted image recognition device according to this embodiment, and FIGS. 5(a) to 5(d) are diagrams illustrating an example of distribution processing, where a state in which a stereoscopic-vision image area and a monocular-vision image area are set in a right captured image is illustrated.

A vehicle-mounted image recognition device 400 performs image processing A405 for absorbing specific faults of the imaging elements of a left camera 401 and a right camera 402 on image data 403 and 404 of captured images captured with the left camera 401 and the right camera 402, as illustrated in FIG. 4. In the image processing A405, noise interpolation, distortion correction, or the like is performed.

Distribution processing 406 of distributing image data subjected to the image processing A905 to an image buffer α 407 and an image buffer β 408 is performed by the distribution unit 109. In the distribution processing 406, the image data subjected to the image processing A405 is stored in both image buffers 407 and 408 or is stored in only one image buffer, and an instruction to perform image processing on the stored image data or the like is given. Specifically, a process of scanning captured images 501 captured with a pair of right and left cameras 401 and 402 along image scanning lines in the right-left direction and distributing the captured images to stereoscopic-vision image data obtained by scanning a predetermined stereoscopic-vision image area 502 of the captured images 501 and monocular-vision image data obtained by scanning a predetermined monocular-vision image area 503 of the right captured image 501 is performed.

The stereoscopic-vision image area 502 is, for example, an area which is used to detect a vehicle or a person through stereoscopic-vision image processing, and is set in each captured image 501 on the basis of the type of the application which is executed among the plurality of applications. The monocular-vision image area 503 is, for example, an area which is used to detect a traffic sign on a road surface or a tail lamp of a preceding vehicle in the front of its own vehicle through monocular-vision image processing and is set in only the captured image 501 captured with the right camera 402 which is one camera. In this embodiment, a case where the monocular-vision image area 503 is set in only the captured image 501 captured with the right camera 402 has been described, but the monocular-vision image area may be set in only the captured image 501 captured with the left camera 401.

The stereoscopic-vision image data and the monocular-vision image data stored in the image buffer α 407 and the image buffer β 408 are used for image processing B409 and image processing C410 by the image processing unit 104. The image buffer α 407 is an image buffer that stores stereoscopic-vision image data, and the image processing B409 corresponds to the conventional parallax processing (stereoscopic-vision image processing) 207. Since a correlation between the right and left images needs to be considered in the parallax processing, the image buffer α 407 stores the stereoscopic-vision image data of the stereoscopic-vision image area 502 corresponding to an area to be a parallax target between the right and left images. In the image processing B409, parallax processing using the stereoscopic-vision image data of the right and left stereoscopic-vision image areas 502 stored in the image buffer α 407 is performed (a stereoscopic-vision image processing unit).

On the other hand, the image buffer β 408 is a small-capacity line image buffer that stores image data corresponding to several lines required for a filtering process from the first line among image lines in the horizontal direction for the purpose of transmission of data to the image buffer β 408 or suppression of a calculation load of the subsequent image processing C410 in the image processing C410, monocular-vision image processing using monocular-vision image data stored in the image buffer β 408 is performed (a monocular-vision image processing unit).

In the image processing B409, since image data having relatively large capacity is necessary and image data are mutually compared, time is required for transmission and processing of an image. An image subjected to image processing suitable for detecting a vehicle or a person and parallax data are acquired through the image processing B409.

On the other hand, in the image processing C410, limitative monocular-vision image processing such as contrast conversion or blurring processing is performed on line image data corresponding to several rows stored in the line buffer. For example, when a filter size for the blurring processing is 3×3, images corresponding to three lines has only to be stored in the image buffer β 408. Images subjected to image processing suitable for detecting a traffic sign or a tail lamp and edge data are acquired through the image processing C410.

The image processing C410 can be performed whenever line image data corresponding to one line is transmitted to the image buffer β 408 by the distribution processing 406. Thus, there is no waiting time for buffering the entire areas of an image and pipeline-like sequential image processing can be performed. Here, since it is difficult in processing time to repeat image processing on a small area several times, a processing combination in consideration of image processing to be applied is necessary. The processing combination will be described later.

Two image processing results are received and the recognition of various objects 411 is performed. Since what image is used for recognition of what object can be determined in advance and information of stereoscopic objects is important, for example, in detecting a vehicle or a person, the recognition processing is performed using the result of the image processing B409. On the other hand, since detection of a traffic sign or detection of a tail lamp can be performed using only information on an image instead of the information on a stereoscopic object, the recognition processing is performed using the result of the image processing C410. A recognition dictionary 412 is used for the recognition of various objects 411. At this time, by causing the recognition dictionary 412 to have a flag based on the distribution processing, it is possible to improve recognition accuracy. Finally, control processing is performed using the result of the recognition of various objects 411 through vehicle control processing 413, a vehicle control policy is determined, and the result is output via a CAN interface 414.

In the recognition of various objects 411 and the vehicle control processing 413, an instruction to reserve distribution processing in a next or next to next imaging cycle is transmitted to a distribution plan 416. For example, when a stereoscopic structure on a road surface is detected in the stereoscopic-vision image processing and it is predicted that an electric bulletin board of an express way appears, a traffic sign in the upper part of the screen is recognized in a next frame and thus image data of the line images is distributed to the image buffer β 408 and an instruction to start the image processing C410 linked therewith is transmitted to the distribution plan 416.

In the distribution plan 416, distribution plan data for the distribution unit 109 is prepared on the basis of the information from the recognition of various objects 411 and the vehicle control processing 413 (a distribution planning unit). In the distribution plan 416, distribution conditions of images to the buffers and image processing for the distribution in the future imaging such as a next cycle or a next to next cycle are stored from the applications. By using previous history, it is possible to prepare distribution plan data through the distribution processing 406 and to instruct image processing in consideration of histogram correction in image processing or intentional randomness. For example, contrast correction is important for recognition of a traffic sign, but it is not easy to calculate an optimal contrast correction parameter. Therefore, by randomly correcting a contrast correction parameter in a constant range and thus referring to history of traffic signal detection or traffic signal recognition results, it is possible to perform adjustment for enhancing accuracy in a period in which a traffic sign appears in an image. On the premise that the contrast correction parameter and the traffic signal detection accuracy are linked with a predetermined model function, the parameter may be corrected on the basis of the derivative value of the function.

The captured images illustrated in FIGS. 5(a) to 5(d) are conceptual diagrams of the captured image 501 captured with the right camera 402. For example, in FIG. 5(a), a traffic sign appearance position is on the front-upper side of its own vehicle and thus the monocular-vision image area 503 as a traffic-sign image area is set on the upper side of the captured image 501. On the other hand, since a detection area of a vehicle or a person for stereoscopic vision is concentrated in the vicinity of the center of the front side of the vehicle and thus the stereoscopic-vision image area 502 as a vehicle/person image area is set to the substantially center of the captured image 501. In this embodiment, the stereoscopic-vision image area 502 and the monocular-vision image area 503 have a rectangular shape and are arranged to overlap each other. The traffic-sign image area and the vehicle person image area may overlap each other or may not overlap each other.

The captured images 501 illustrated in FIGS. 5(a) to 5(d) are sequentially scanned, for example, in the horizontal direction from left to right from the upper line. In the example illustrated in FIG. 5(a), as for image scanning line 1, scan data has only to be transmitted for a traffic sign and thus the scan data is (distributed to and stored in only the image buffer β 408.

On the other hand, in image scanning line 2, since the monocular-vision image area 503 and the stereoscopic-vision image area 502 overlap each other, the scan data is transmitted to the image buffer α 407 and the image buffer β 408. That is, scan data of image scanning line 2 is distributed to and stored in the image buffer α 407 and the image buffer β 408. In image scanning line 3, scan data has only to be transmitted for stereoscopic vision and thus the scan data is distributed to and stored in only the image buffer α 407.

The arrangement of detection areas may be dynamically changed. For example, in the example illustrated in FIG. 5(b) the stereoscopic-vision image area 502 is shifted upward from that illustrated in FIG. 5(a). For example, this situation can occur when the upper part of the captured image 501 needs to be viewed in stereoscopic vision such as when a steep grade is present on the front side. In this case, unlike the above description, the scan data of image scanning line 1 needs to be transmitted to the image buffer α 407 and the image buffer β 408. The scan data of image scanning line 3 does not need to be transmitted to both buffers.

Figure 5A:
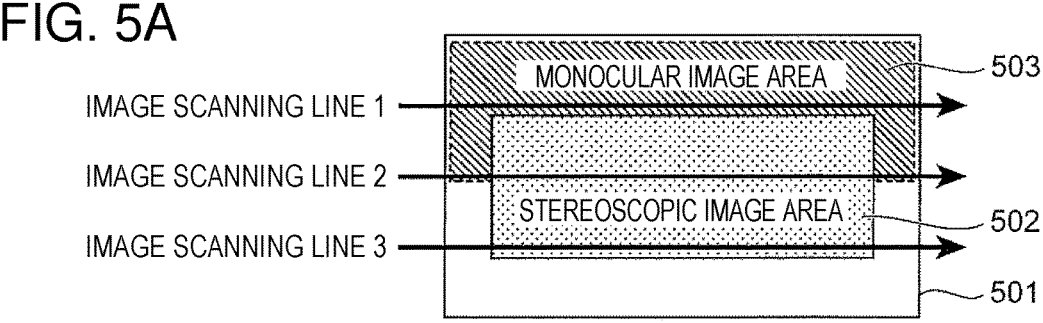
FIGS. 5A-5D are diagrams illustrating an example of distribution processing.
Figure 5B:
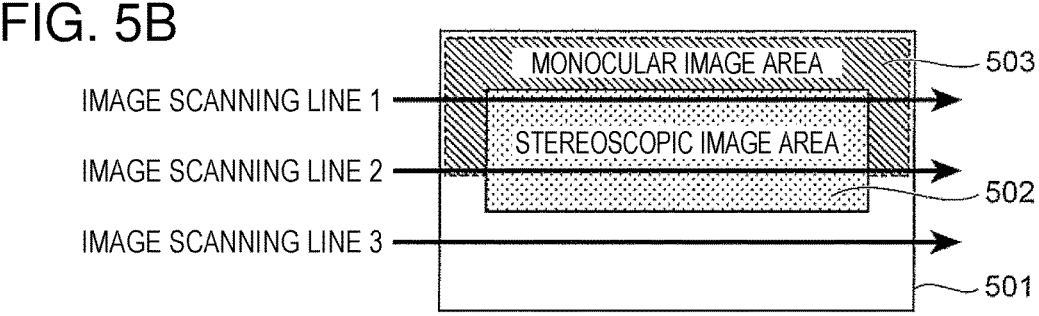
Figure 5C:
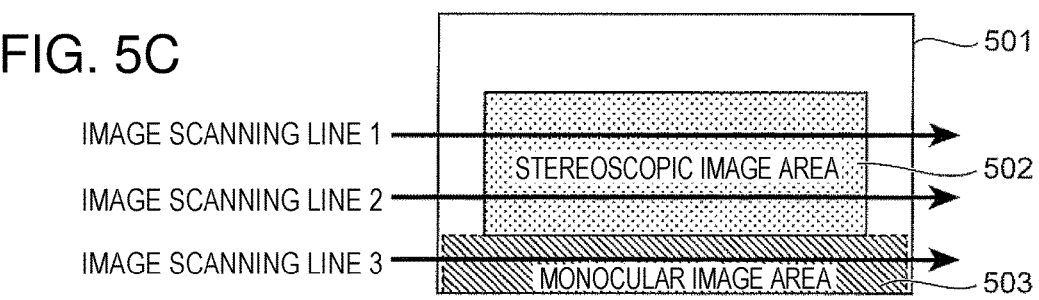
Figure 5D:
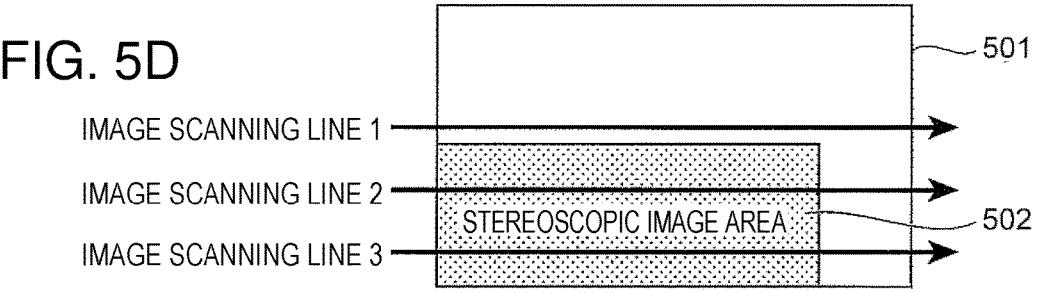

As illustrated in FIG. 5(c), when a short stereoscopic object is present near and there is a possibility that the object will be a child, the monocular-vision image area 503 which is used for an image processing application such as monocular detection of a person or an optical flow may be disposed in the lower part of the captured image 501 to set image scanning line As illustrated in FIG. 5(d), depending on vehicle control information, the stereoscopic-vision image area 502 may be shifted to right and left as if a person views an object with crossed eyes or a sidelong glance. When the calculation load of the image processing B409 is large, the same processing can be performed using a monocular application. That is, by enabling classification of the buffers and designation of image processing to be performed through the distribution processing 406, it is possible to flexibly construct an application range of an application in the stereoscopic camera and to reduce a processing time by adjusting timings.

In the distribution processing 406, when it is detected that an object such as a child gets closer to its own vehicle than a predetermined position, setting of the monocular-vision image area 503 may be stopped and only the image processing B409 using only the stereoscopic-vision image data of the stereoscopic-vision image area 502 may be performed.

FIG. 6 is a timing chart illustrating the processes in the present invention.

In the timing chart illustrated in FIG. 6, two system flows are illustrated as image processing 601 and operation processing 602. The flow of the image processing 601 represents processing times in the image processing unit 104 illustrated in FIG. 1, and the flow of the operation processing 602 represents processing times in the operation processing unit 105 illustrated in FIG. 1.

First, in the image processing 601, right image input 603 is performed. This corresponds to a process of capturing an image with the right camera 402 in FIG. 4, performing the image processing A405 on the captured image, and storing stereoscopic-vision image data of the stereoscopic-vision image area 502 of the right image in the image buffer α 407 and storing monocular-vision image data of the monocular-vi-s ion image area 503 of the right image in the image buffer β 408.

Then, left image input 604 is performed. This corresponds to a process of capturing an image with the left camera 401 in FIG. 4, performing the image processing A405 on the captured image, and storing stereoscopic-vision image data of the stereoscopic-vision image area 502 of the left image in the image buffer α 407.

First, the right image input 603 is performed. In the image processing C410, it is not necessary to wait until all image data is prepared for the right image input, transmission of data 606 is performed by the distribution process in 406 in the intermediate step, some data is stored in the image buffer β 408, and image processing 609 is additionally performed. The image processing 609 mentioned herein corresponds to the image processing C410 in FIG. 4.

In this step, it is not necessary to perform image processing for the parallax processing and it is possible to perform image processing suitable for an assumed application. For example, in the parallax processing, contrast adjustment is performed to detect a stereoscopic object at the center of the front side of its own vehicle as easily as possible, but it is difficult to recognize an object appearing dark in the periphery. Therefore, the traffic-sign image area in which recognition of a traffic sign or the like is assumed is subjected to a contrast adjusting process of brightening a dark object to ease blurring processing, color processing of emphasizing colors of the traffic sign, or a process using time-series history of first randomly setting a contrast value and determining an optimal contrast value depending on the detection result to find out the optimal contrast value.

In the image processing 601, that is, the image processing unit 104, the left image input 604 and the parallax processing 605 are performed, but the recognition of various objects based on a non-stereoscopic system (plane system) such as recognition of a traffic sign or detection of a vehicle tail lamp can be performed previously. After the parallax processing 605, image data of the entire image area to be recognized (the entire stereoscopic-vision image area) and parallax data are acquired. Thus, the data can be transmitted to the operation processing unit 105 at the end timing 608 of the parallax processing 605 and the recognition of various objects 611 can be performed based on stereoscopic system in the operation processing 602.

The recognition processing result based on the non-stereoscopic system may be received and the parallax information may be used in this stage. For example, the detection of a vehicle tail lamp can be performed at the timing of the recognition of various objects 610 based on the plane system on the basis of the image processing, but measurement of the distance to the detected tail lamp can be performed in the recognition of various objects 611 based on the stereoscopic system. Accordingly, it is possible to achieve efficient processing and distribution, to drive a recognition application at a timing difference between the image processing unit 104 and the operation processing unit 105, and to improve the processing efficiency as a whole.

The results of the recognition of various objects 610 and 611 are received and control processing is performed in vehicle control processing 612. In the vehicle control processing 612, by driving an application and setting image processing therefor depending on external conditions and vehicle braking condition, it is possible to improve recognition accuracy. For example, when a steering wheel is turned to right but an object to be viewed is present on the left side or when a small stereoscopic object appears and is likely to be hidden in the lower part of the area, how to set a next area is determined. How to correct contrast based on external darkness is also set. When a stereoscopic object is present on the road surface in the front of the vehicle, a monocular-vision recognition area (the monocular-vision image area) is set in the upper part for the purpose of preparation for recognition of an area in which appearance of an electric bulletin board is assumed after several frames.

Figure 7:
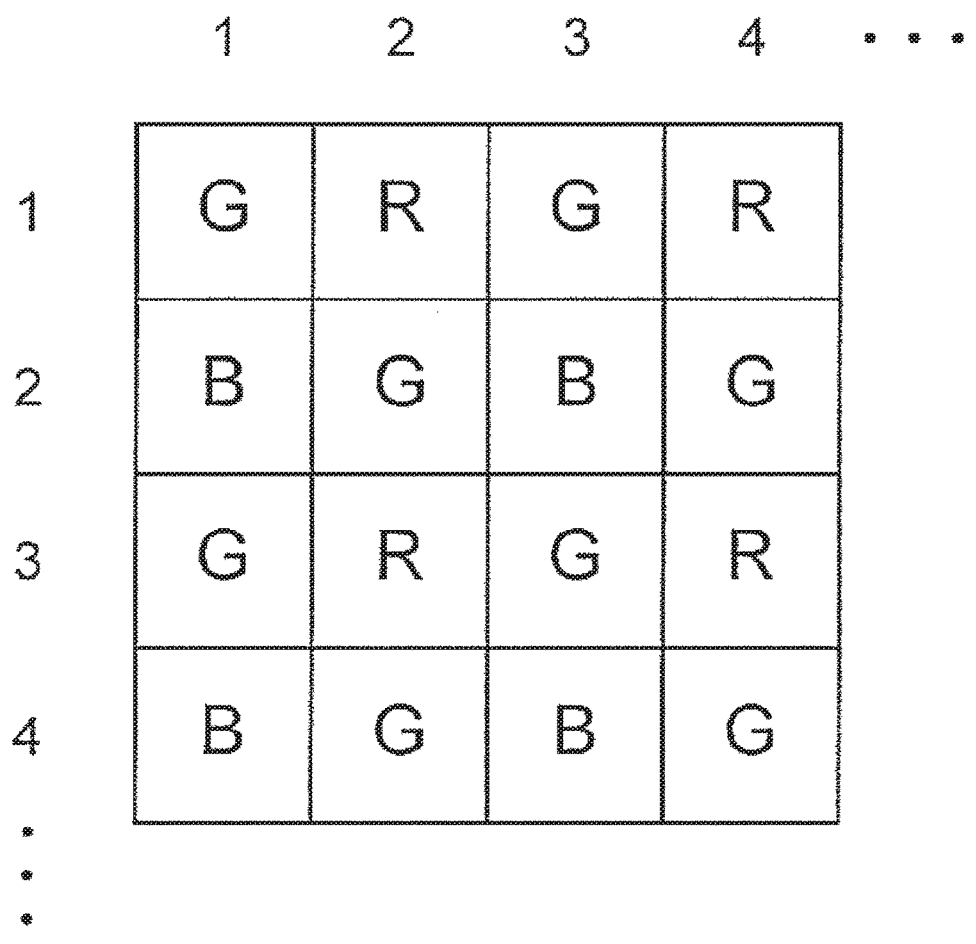

FIG. 7 illustrates an example of an image captured with a general imaging element and, for example, an image acquired by the right image input 603 and subjected to the image processing 609 corresponds to the image.

For example, regarding processing of an image buffer suitable for the recognition of a traffic sign, flexible image processing suitable for an application can be constructed by adding a process of emphasizing red or instructing the distribution unit 109 to perform a process of transmitting only odd-numbered horizontal lines 1, 3, . . . for reduction of a memory at the time of recognition of a characteristic traffic sign such as red. Since repetition of image processing on a small area is difficult in processing time, a processing combination based on the assumption of image processing to be applied is necessary. Hereinafter, the processing combination when some data is stored in the image buffer β 408 and the image processing 609 is performed will be described in brief.

A process of collecting some horizontal lines of an image is basically performed in processing the image buffer. For example, the filtering process such as blurring processing or edge extraction using three pixels in the vertical direction and three pixels in the horizontal direction (3×3) as a unit can be performed in a stage in which image data in three horizontal lines is recorded in the image buffer. Examples of the filter operation processing in processing the image buffer include contrast conversion, image blurring, image sharpening, and Hough transform. Since it is difficult to repeat these image processing operations plural times, the processing combination of combining the operation results is performed.

Figures 9, 10:
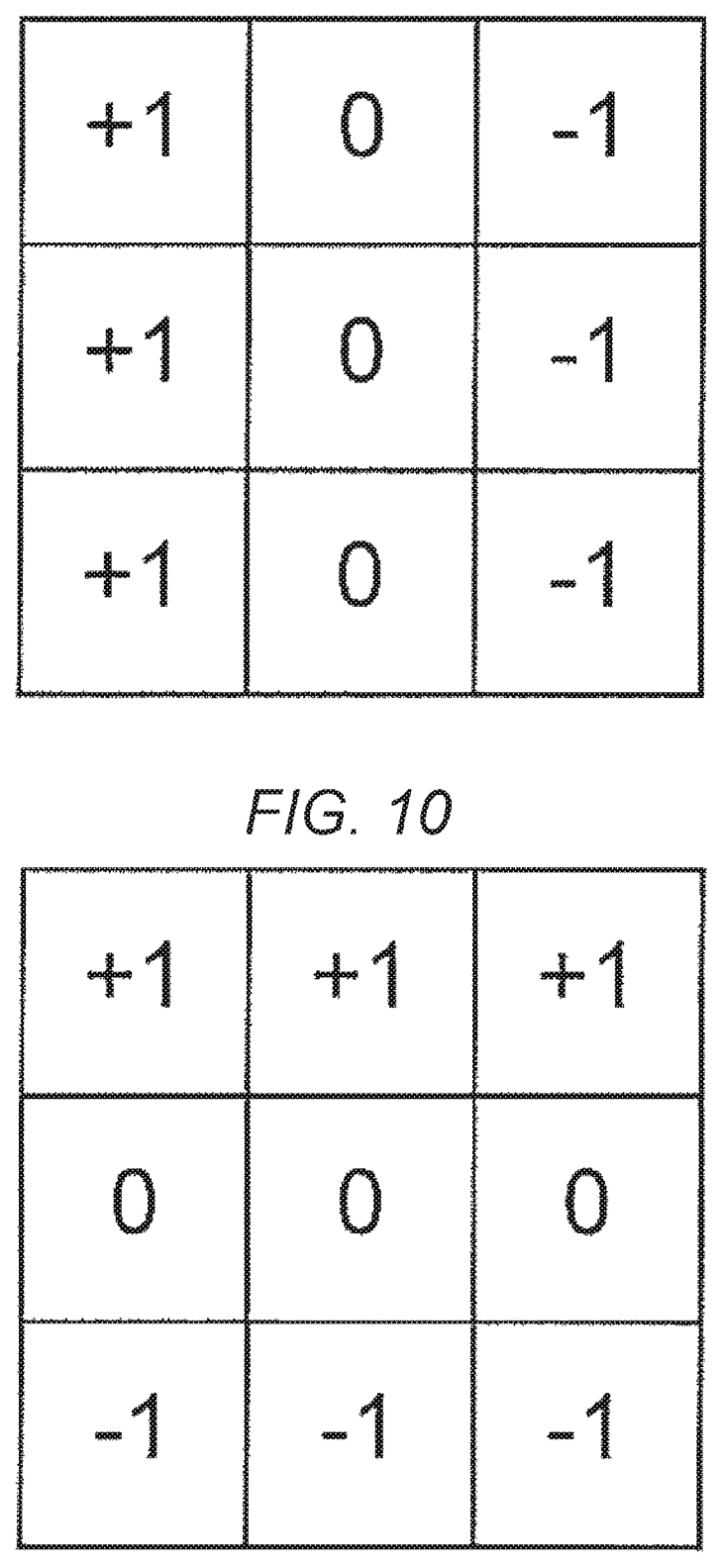

The processing combination will be described below with the Hough transform which is important in detection of a traffic sign as an example. The Hough transform is a process of estimating that a center of a circle or a rectangle is present in the direction of an angle of an edge extracted from an image. Here, the processing combination course from the edge extraction using a 3×3 filter to the Hough transform will be described. It is assumed that a target image from which an edge is extracted and pixels thereon are expressed by pij as illustrated in FIG. 8. At this time, the edge strength in the vertical direction with p22 as a target point can be calculated by convolution with a filter illustrated in FIG. 9. The edge strength in the horizontal direction can be calculated by convolution with a filter illustrated in FIG. 10 in the same way. At this time, the angle of the edge for the target point p22 can be estimated to be the horizontal edge strength/the vertical edge strength.

It is assumed that a square norm of an edge vector is used as the edge strength. At this time, the process from the edge extraction to the Hough transform can be performed within a 3×3 pixel range centered on the pixel p22 using the following calculations.

$$\text{Edge strength} = (p11+p12+p13-p31-p32-p33)^2 + (p11+p21+p31-p13-p23-p33)^2 \quad (1)$$

$$\text{Edge(horizontal)} = p11+p12+p13-p31-p32-p33/\text{edge strength} \quad (2)$$

$$\text{Edge(vertical)} = p11+p21+p31-p13-p23-p33/\text{edge strength} \quad (3)$$

$$\text{Edge angle} = (p11+p12+p13-p31-p32-p33)/(p11+p21+p31-p13-p23-p33) \quad (4)$$

Accordingly, when the Hough transform based on the edge angle is performed, {p22, edge (horizontal)/edge (vertical), edge strength} acquired through the above-mentioned calculation sequence in the scanning range of 3×3 may be recorded in a Hough transform space.

Accordingly, the filtering process including three steps of calculating a horizontal edge, calculating a vertical edge, and calculating an edge angle can be incorporated into one calculation process. Similarly, when blurring or sharpening is performed on an image and then the edge detection and the Hough transform are performed, necessary calculation points can be collected from a series of image processing.

The processing combination is classified into exact derivation of extracting all elements (pixel, pij) used in the calculation process from the image filtering operation including several steps and deriving a calculation expression acquired as a final result and derivation based on an approximation.

The derivation based on an approximation includes the following processes. First, a model formula is assumed from elements (pij) to be used. In the case of the edge extraction and the Hough transform, the model formula has a form in which secondary polynomials are present in the denominator and the numerator. That is, the following model formula is obtained.

$$\text{Model formula} = \Sigma\{ak \cdot pij \cdot pnm\}/\Sigma\{bk \cdot pij \cdot pnm\} \quad (5)$$

Then, when the coefficients ak and bk of the model formula are calculated, an approximate value of a value to be calculated can be derived for a pixel group {pij} with a certain scanning range (for example, 3×3). Here, how to calculate the coefficients ak and bk is important. This can be achieved by comparing a value of an exact solution for a pixel set {pij} at an arbitrary position in a training image with a value of an approximate solution and adjusting the values ak and bk to minimize the error therebetween as much as possible. The processing combination based on an approximation has a merit that the processing load can be reduced by limiting an order or a functional type of the model formula.

While embodiments of the present invention have been described above in detail, the present invention is not limited to the embodiments, but can be modified in various design forms without departing from the spirit of the present invention described in the appended claims. For example, the embodiments are described in detail to easily understand the present invention and the present invention is not limited to including of all the above-mentioned elements. A partial configuration of a certain embodiment may be replaced with a configuration of another embodiment, or a configuration of another embodiment may be added to a configuration of a certain embodiment. Addition, deletion, or replacement with another configuration may be performed on some configurations of the embodiments

REFERENCE SIGNS LIST 100 vehicle-mounted image recognition device
101L left camera
101R right camera
104 image processing unit
105 operation processing unit
106 storage unit
108 control processing unit
109 distribution unit
409 image processing B (stereoscopic-vision image processing unit)
410 image processing C (monocular-vision image processing unit)

The invention claimed is:

1. A vehicle-mounted image recognition device that recognizes a vehicle exterior environment using a captured image which is captured with a pair of right and left cameras to execute a plurality of applications, the vehicle-mounted image recognition device comprising:
a distribution unit configured to set a stereoscopic-vision image area in captured images captured with the pair of right and left cameras and to set a monocular-vision image area in captured images captured with one camera on the basis of a type of the application which is executed among the plurality of applications, to scan the captured images captured with the pair of right and left cameras along an image scanning line in a right-left direction, and to distribute the captured images to stereoscopic-vision image data obtained by scanning stereoscopic-vision image areas and monocular-vision image data obtained by scanning monocular-vision image areas;
a stereoscopic-vision image processing unit configured to perform stereoscopic-vision image processing using the stereoscopic-vision image data;
a monocular-vision on image processing unit configured to perform monocular-vision image processing using the monocular-vision image data; and an object recognizing unit configured to recognize an object depending on the type of the application using an image processing result of the stereoscopic-vision image processing unit and an image processing result of the monocular-vision image processing unit a stereoscopic-vision image buffer configured to store the stereoscopic-vision image data; and a monocular-vision image buffer configured to store the monocular-vision image data, wherein the stereoscopic-vision image processing unit performs the stereoscopic-vision image processing after the stereoscopic-vision image data is completely stored in the stereoscopic-vision image buffer, and the monocular-vision image processing unit performs the monocular-vision image processing while storing the monocular-vision image data in the monocular-vision image buffer.

2. The vehicle-mounted image recognition device according to claim 1, comprising:
 a vehicle control processing unit configured to determine a vehicle control policy using the object recognition result of the object recognizing unit; and
 a distribution planning unit configured to prepare distribution plan data which is used by the distribution unit on the basis of information from the object recognizing unit and the vehicle control processing unit.

3. The stereoscopic camera according to claim 1, wherein the distribution unit stops setting of the monocular-vision image area when an approach of an object is detected.

* * * * *